US011999584B2

(12) United States Patent
Mizutani

(10) Patent No.: US 11,999,584 B2
(45) Date of Patent: Jun. 4, 2024

(54) POST-PROCESSING APPARATUS

(71) Applicant: TOSHIBA TEC KABUSHIKI KAISHA, Tokyo (JP)

(72) Inventor: Kikuo Mizutani, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/104,810

(22) Filed: Feb. 2, 2023

(65) Prior Publication Data

US 2023/0219780 A1 Jul. 13, 2023

Related U.S. Application Data

(63) Continuation of application No. 17/570,400, filed on Jan. 7, 2022, now Pat. No. 11,597,621.

(51) Int. Cl.
*B65H 31/10* (2006.01)
*B65H 29/18* (2006.01)
(Continued)

(52) U.S. Cl.
CPC ............. *B65H 31/10* (2013.01); *B65H 29/18* (2013.01); *B65H 43/00* (2013.01);
(Continued)

(58) Field of Classification Search
CPC ........ B65H 29/18; B65H 31/28; B65H 43/00; B65H 2513/10; B65H 2553/40; G03G 15/6552
(Continued)

(56) References Cited

U.S. PATENT DOCUMENTS 6,076,825 A * 6/2000 Kato ...................... B65H 31/00 271/213
6,145,826 A * 11/2000 Kawata .................. B65H 31/10 271/215
(Continued)

FOREIGN PATENT DOCUMENTS

JP 2000-118824 4/2000
JP 2000-143056 5/2000
(Continued)

*Primary Examiner* — Leslie A Nicholson, III
(74) *Attorney, Agent, or Firm* — Amin, Turocy & Watson, LLP

(57) ABSTRACT

A post-processing apparatus includes a conveyance unit, a discharge port, a tray, an elevation unit, a detection unit, and a control unit. The conveyance unit conveys a print medium supplied from an image forming apparatus. The discharge port discharges the print medium conveyed by the conveyance unit. The tray is stacked with the print medium discharged from the discharge port and can be raised and lowered in a vertical direction. The elevation unit raises and lower the tray in the vertical direction. The detection unit detects a top surface of an uppermost print medium of one or more sheets of print media stacked on the tray. The control unit controls the conveyance unit and the elevation unit and hold a relative position of the top surface with respect to the discharge port if the print medium is discharged from the discharge port at a first position. The control unit causes the conveyance unit to convey the print medium at a first speed if a discharge time from a first timing indicating the timing relating to discharge of the print medium from the discharge port to a second timing indicating the timing when the print medium is detected by the detection unit is a first time and causes the conveyance unit to convey the print medium at a second speed different from the first speed if the discharge time is a second time.

20 Claims, 8 Drawing Sheets

(51) Int. Cl.
*B65H 43/00* (2006.01)
*G03G 15/00* (2006.01)

(52) U.S. Cl.
CPC ..... *G03G 15/6552* (2013.01); *B65H 2513/10* (2013.01); *B65H 2553/40* (2013.01)

(58) Field of Classification Search
USPC ...... 270/58.11, 58.13, 58.19, 58.28; 271/202
See application file for complete search history.

(56) References Cited

U.S. PATENT DOCUMENTS

| | | | | |
|---|---|---|---|---|
| 6,494,449 | B2 | 12/2002 | Tamura et al. | |
| 6,786,483 | B2 | 9/2004 | Nishimura et al. | |
| 7,175,173 | B2 * | 2/2007 | Anzai | B65H 5/34 270/58.11 |
| 7,798,481 | B2 | 9/2010 | Terao et al. | |
| 8,002,273 | B2 | 8/2011 | Matsumoto et al. | |
| 8,286,959 | B2 * | 10/2012 | Harashina | B42C 1/125 270/58.11 |
| 8,412,091 | B2 * | 4/2013 | Iguchi | B41J 2/32 399/411 |
| 8,413,978 | B2 | 4/2013 | Watanabe et al. | |
| 8,678,368 | B2 * | 3/2014 | Yoshida | B65H 31/02 270/58.11 |
| 8,690,142 | B2 | 4/2014 | Nagata | |
| 9,340,390 | B2 * | 5/2016 | Ishikawa | B65H 31/08 |
| 9,809,408 | B2 | 11/2017 | Maenishi et al. | |
| 9,932,194 | B2 | 4/2018 | Tokuma | |
| 9,983,536 | B2 * | 5/2018 | Terao | G03G 15/55 |
| 10,364,118 | B2 * | 7/2019 | Ishikawa | B65H 31/10 |
| 2009/0057976 | A1 | 3/2009 | Izuka | |
| 2010/0244370 | A1 * | 9/2010 | Harashina | B42C 1/125 271/220 |

FOREIGN PATENT DOCUMENTS

| | | |
|---|---|---|
| JP | 2007-131398 | 5/2007 |
| JP | 2007-204271 | 8/2007 |
| JP | 2009-007108 | 1/2009 |

* cited by examiner

POST-PROCESSING APPARATUS

CROSS-REFERENCE TO RELATED APPLICATION

This application is a Continuation of application Ser. No. 17/570,400 filed on Jan. 7, 2022, the entire contents of which are incorporated herein by reference.

FIELD

Embodiments described herein relate generally to a post-processing apparatus.

BACKGROUND

In the related art, in a post-processing apparatus connected to an image forming apparatus, a print medium on which an image was already formed by the image forming apparatus is discharged from a discharge port provided in the post-processing apparatus onto a tray on which the print medium is stacked. In this case, in the post-processing apparatus of the related art, a speed at which the print medium is discharged from the discharge port is changed depending on a type of the print medium, the number of bundles of the print medium, a height of the print medium stacked on the tray, and the like. However, the post-processing apparatus of the related art does not detect a stacking state of the print medium stacked on the tray. For that reason, in the post-processing apparatus of the related art, excessive projection of the print medium due to a downward curl of the print medium and rising of a rear end of the print medium due to an upward curl of the print medium stacked on the tray may occur. Occurrence of these events is not preferable because the events cause defective alignment of the print medium on the tray, a paper jam of the print medium discharged from the discharge port, and the like.

DETAILED DESCRIPTION

Hereinafter, an image forming system according to an embodiment will be described with reference to the drawings, taking an image forming system 1 as an example. A three-dimensional coordinate system TC drawn in some figures is a three-dimensional Cartesian coordinate system indicating the directions in each figure in which the three-dimensional coordinate system TC is drawn. For convenience of explanation, the X-axis in the three-dimensional coordinate system TC will be referred to simply as the X-axis. For convenience of explanation, the Y-axis in the three-dimensional coordinate system TC will be referred to simply as the Y-axis. For convenience of explanation, the Z-axis in the three-dimensional coordinate system TC will be referred to simply as the Z-axis. As an example, a case where a negative direction of the Z-axis and the direction of gravity coincide with each other will be described. For convenience of explanation, a positive direction of the Z-axis will be referred to as an upward direction or simply upward. For convenience of explanation, the negative direction of the Z-axis will be referred to as a downward direction or simply downward.

Figure 1:
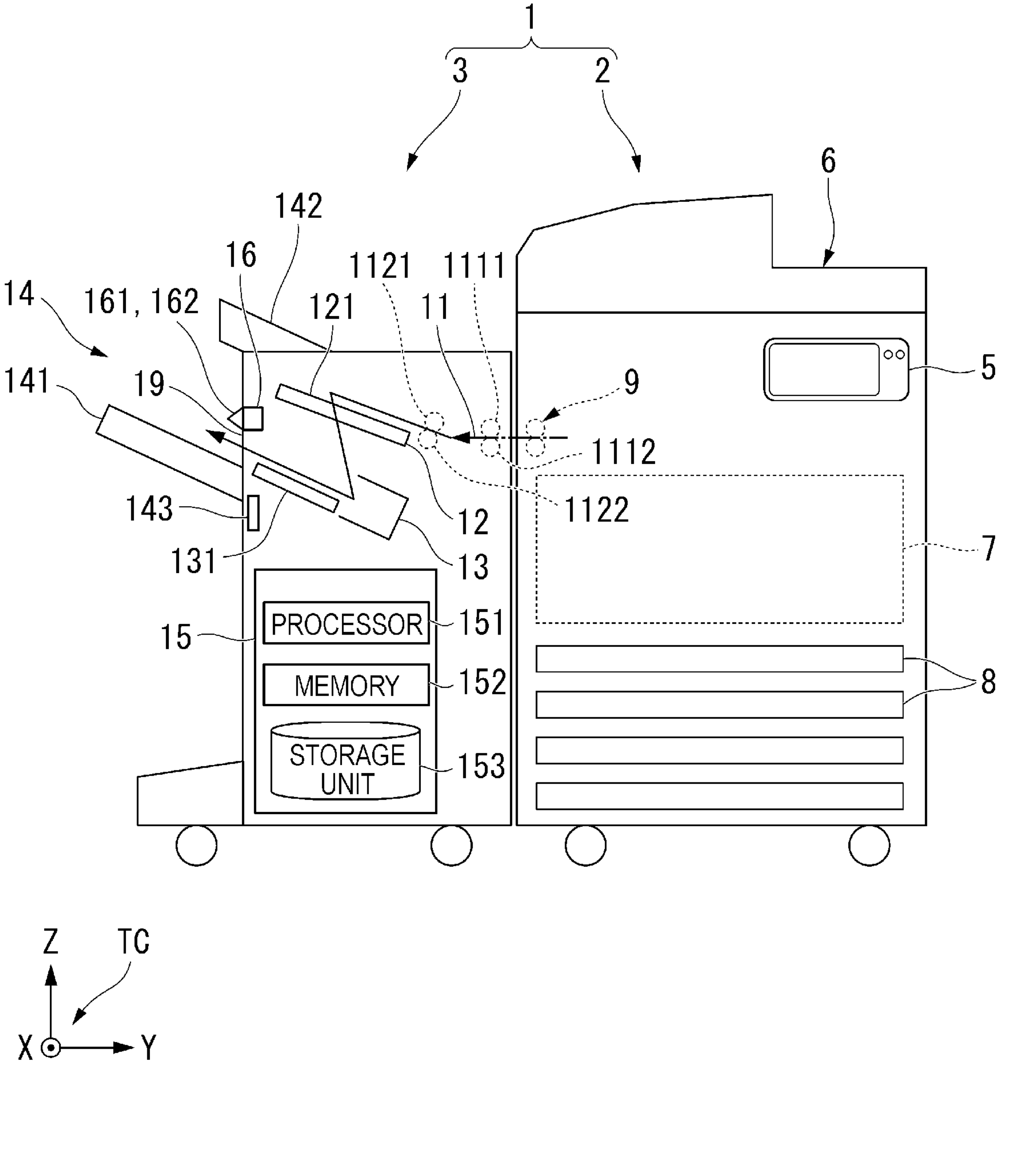
FIG. 1 is a side view illustrating an example of a configuration of an image forming system 1.

FIG. 1 is a side view illustrating an example of a configuration of the image forming system 1.

As illustrated in FIG. 1, the image forming system 1 includes an image forming apparatus 2 and a post-processing apparatus 3. The image forming apparatus 2 forms an image on a print medium S. The print medium S is, for example, a sheet-like medium such as paper, but is not limited thereto. The post-processing apparatus 3 executes post-processing on the print medium S conveyed from the image forming apparatus 2. The post-processing may be any processing as long as the post-processing is processing executed after an image is formed on the print medium S by the image forming apparatus 2. For example, the post-processing is stapling (fixing by a stapler) or the like.

The image forming apparatus 2 includes a processor, a memory, an auxiliary storage device, and the like connected by a bus, and executes a program. The image forming apparatus 2 includes a control panel 5, a scanner unit 6, a printer unit 7, a paper feeding unit 8, and a paper ejection unit 9.

The control panel 5 receives an operation of a user. For example, the control panel 5 includes a part or all of various keys, a touch panel, and the like. The control panel 5 receives input regarding the type of post-processing to the print medium S. Information regarding the type of post-processing input by the control panel 5 is output to the post-processing apparatus 3.

The scanner unit 6 includes a reading unit. The reading unit reads image information of an object to be copied. The scanner unit 6 outputs the image information read by the scanning unit to the printer unit 7. The printer unit 7 forms an output image with a developer such as toner based on the image information output from the scanner unit 6 or image information transmitted from an external device. The printer unit 7 applies heat and pressure to a toner image transferred to the print medium S to fix the toner image on the print medium S. The paper feeding unit 8 supplies the print media S to the printer unit 7 one by one in accordance with the timing when the printer unit 7 forms the toner image. The paper ejection unit 9 conveys the print medium S ejected from the printer unit 7 to the post-processing apparatus 3.

The post-processing apparatus 3 is disposed adjacent to the image forming apparatus 2 as illustrated in FIG. 1. The post-processing apparatus 3 executes post-processing designated through the control panel 5 on the print medium S conveyed from the image forming apparatus 2.

Figure 2:
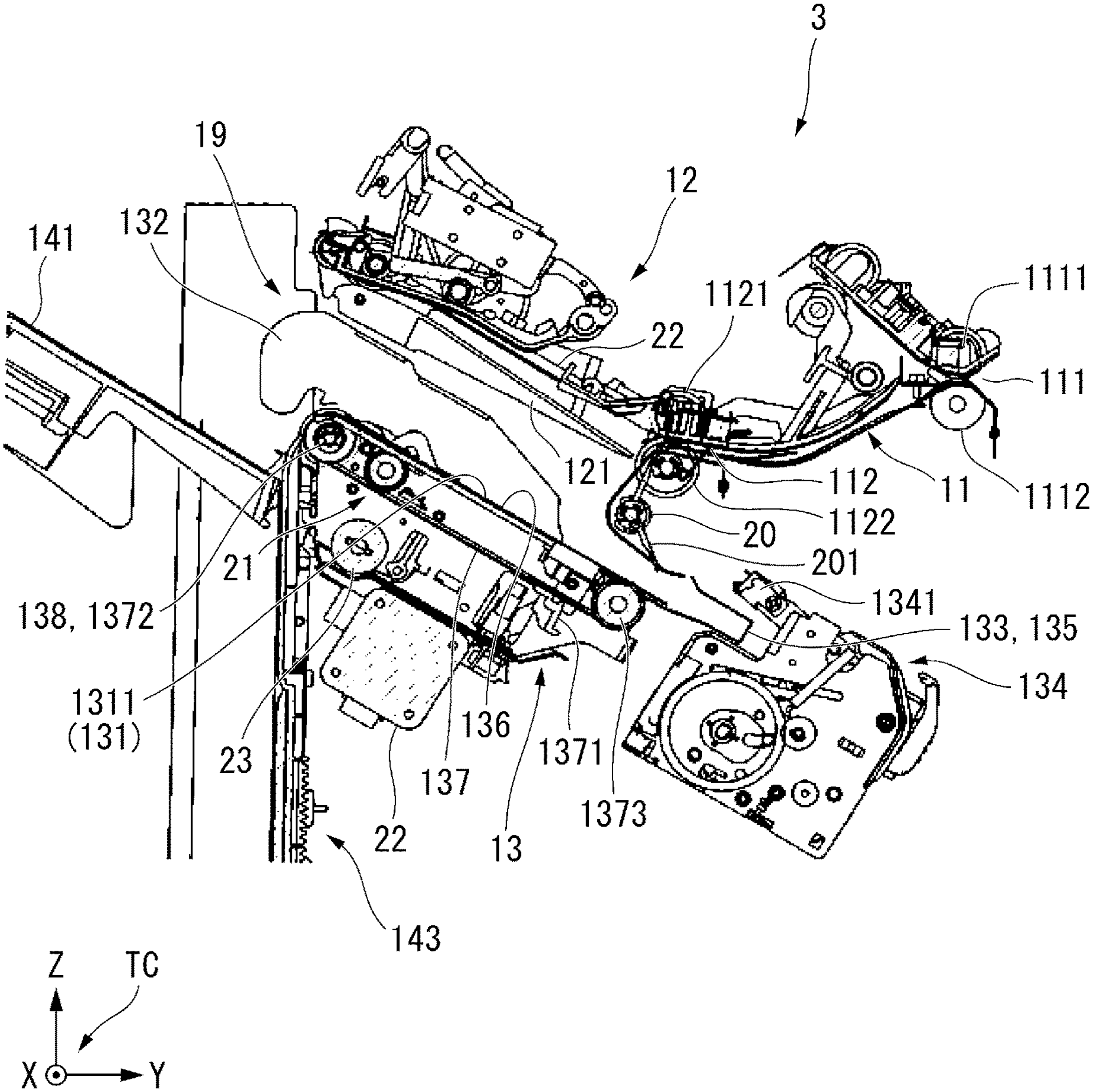
FIG. 2 is a side view illustrating an example of a more detailed configuration of a post-processing apparatus 3.

FIG. 2 is a side view illustrating an example of a more detailed configuration of the post-processing apparatus 3. The post-processing apparatus 3 includes a conveyance path 11, a standby unit 12, a processing unit 13, a discharge unit 14, a control unit 15, and a detection unit 16.

The print medium S is conveyed along the conveyance path 11 following the paper ejection unit 9 of the image forming apparatus 2. The conveyance path 11 includes a print medium supply port 111 and a print medium carry-out port 112.

The print medium supply port 111 faces the paper ejection unit 9 of the image forming apparatus 2. The print medium supply port 111 is provided with a pair of rollers of an inlet roller 1111 and an inlet roller 1112. The print medium S is supplied from the image forming apparatus 2 to the print medium supply port 111. The print medium S supplied to the print medium supply port 111 by the image forming apparatus 2 is conveyed toward the print medium carry-out port 112 with the inlet roller 1111 and the inlet roller 1112. The operations of the inlet roller 1111 and the inlet roller 1112 are controlled by the control unit 15.

The print medium carry-out port 112 faces the standby unit 12. The print medium carry-out port 112 is provided with a pair of rollers of an outlet roller 1121 and an outlet roller 1122. The print medium S that passed through the conveyance path 11 with the inlet roller 1111 and the inlet roller 1112 is conveyed from the print medium carry-out port 112 to the standby unit 12 with the outlet roller 1121 and the outlet roller 1122. The operations of the outlet roller 1121 and the outlet roller 1122 are controlled by the control unit 15.

The standby unit 12 temporarily retains (buffers) the print medium S conveyed from the image forming apparatus 2. The standby unit 12 includes a standby tray 121. For example, the standby unit 12 makes one or more sheets of subsequent print media S stand by while the processing unit 13 performs post-processing of the preceding print medium S. The standby unit 12 is disposed above the processing unit 13. For example, the standby unit 12 puts preset one or more sheets of print media S on top of each other and makes the print media stand by. If the processing unit 13 becomes available, the standby unit 12 drops the retained print medium S toward the processing unit 13.

The processing unit 13 executes post-processing on the conveyed print medium S. The processing unit 13 includes a processing tray 131 that receives the print medium S dropped from the standby unit 12. The processing unit 13 executes post-processing on a print medium bundle SS, which is a bundle obtained by putting one or more sheets of print media S on top of each other to be aligned. For example, the post-processing executed by the processing unit 13 is binding (stapling). The processing unit 13 discharges the print medium bundle SS subjected to the post-processing to the discharge unit 14.

The discharge unit 14 includes a movable tray 141, a fixed tray 142, and an elevation unit 143. The movable tray 141 is provided on a discharge surface of the post-processing apparatus 3. In the example illustrated in FIG. 1, the discharge surface of the post-processing apparatus 3 is a surface on the negative direction side of the Y-axis among the surfaces of the post-processing apparatus 3. The print medium S after being subjected to the post-processing is discharged from the processing unit 13 to the movable tray 141. For convenience of explanation, a top surface of the uppermost print medium of the one or more sheets of print media S stacked on the movable tray 141 will be referred to simply as the top surface. The movable tray 141 can be raised and lowered (movable) in a vertical direction along the discharge surface of the post-processing apparatus 3. The movable tray 141 is provided with a sensor that detects that one or more sheets of print media S are stacked on the movable tray 141. If the sensor detects that one or more sheets of print media S are stacked on the movable tray 141, the sensor outputs a signal indicating that one or more sheets of print media S are stacked on the movable tray 141 to the control unit 15. The fixed tray 142 is provided on the upper part of the post-processing apparatus 3. For example, the print medium S is appropriately discharged from the standby unit 12 to the fixed tray 142.

The elevation unit 143 raises and lowers (moves) the movable tray 141 in the vertical direction. In FIG. 1, to simplify the figure, the elevation unit 143 is drawn as a rectangular object. The elevation unit 143 may have any configuration as long as the elevation unit 143 has a configuration in which the movable tray 141 can be raised and lowered in the vertical direction. For example, the elevation unit 143 is configured to include a rack, a pinion, gears, a motor, and the like. For convenience of explanation, a lowest position among the positions where the movable tray 141 can be located will be referred to as a lowermost position.

The discharge unit 14 includes the discharge port 19 capable of discharging the print medium S for each of the movable tray 141 and the fixed tray 142 exposed to the outside of the apparatus main body of the post-processing apparatus 3.

The control unit 15 controls the overall operation of the post-processing apparatus 3. The control unit 15 is configured with a control circuit including a processor 151, a memory 152, a storage unit 153, and the like connected to each other by a bus. The control unit 15 controls an operation of each functional unit of the post-processing apparatus 3. For example, the control unit 15 controls the conveyance path 11, the standby unit 12, the processing unit 13, and the discharge unit 14.

The processor 151 is, for example, a central processing unit (CPU). The processor 151 may be another processor such as a field programmable gate array (FPGA) instead of the CPU. The processor 151 executes various programs stored in each of the storage units 153, and performs various processes to be performed by the control unit 15.

The memory 152 is a volatile storage device that temporarily stores various types of information. For example, the memory 152 is a random access memory (RAM) or the like.

The storage unit 153 is a non-volatile storage device that stores various types of information. For example, the storage unit 153 is a flash memory, a hard disk drive (HDD), or the like.

Figure 3:
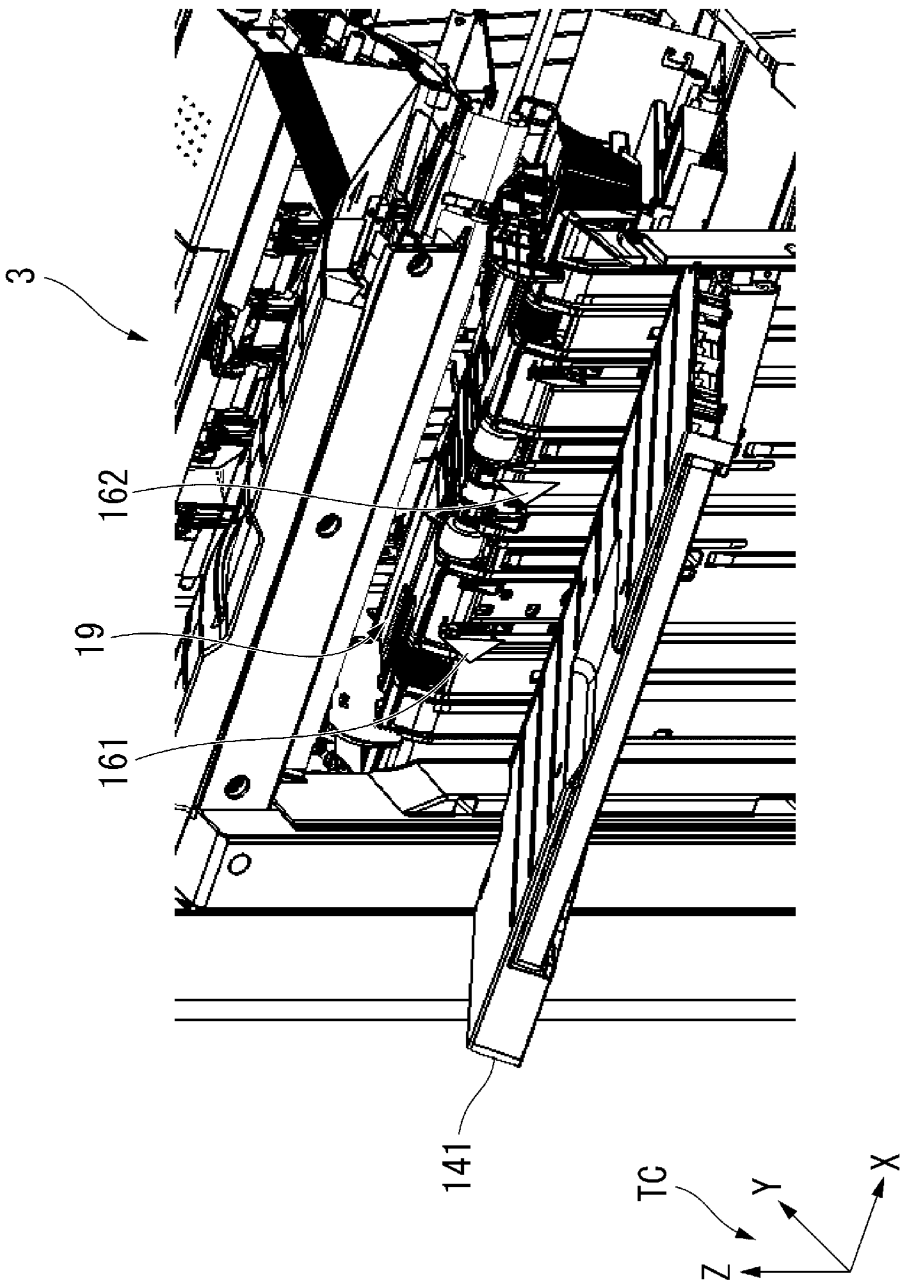
FIG. 3 is a diagram illustrating an example of a configuration of a detection unit 16.

The detection unit 16 detects the top surface. The detection unit 16 may have any configuration as long as the detection unit 16 has a configuration capable of detecting the top surface. In FIG. 2, the detection unit 16 is omitted in order to prevent the figure from becoming complicated. As an example, a case where the detection unit 16 has a configuration as illustrated in FIG. 3 will be described. FIG. 3 is a diagram illustrating an example of the configuration of the detection unit 16. The detection unit 16 includes an actuator 161 and an actuator 162.

The actuator 161 and the actuator 162 protrude from the discharge surface in a discharge direction in which the print medium S is discharged from the discharge port 19. In the examples illustrated in FIGS. 1 to 3, the discharge direction is the negative direction of the Y-axis. Each of the actuator 161 and the actuator 162 can move in a direction opposite to the discharge direction. For that reason, if a force is applied to each of the actuator 161 and the actuator 162 in the opposite direction, each of the actuator 161 and the actuator 162 moves in the opposite direction and does not protrude from the discharge surface. For convenience of explanation, a state in which each of the actuator 161 and the actuator 162 protrudes from the discharge surface will be referred to as a protruding state. For convenience of explanation, a state in which each of the actuator 161 and the actuator 162 does not protrude from the discharge surface will be referred to as a non-protruding state.

If the actuator 161 and the actuator 162 are pushed in the direction opposite to the discharge direction by the uppermost print medium S of the one or more sheets of print media S stacked on the movable tray 141, the actuator 161 and the actuator 162 are in the non-protruding state. The detection unit 16 detects the top surface of the actuator 161 and the actuator 162 by the uppermost print medium S changing the actuator 161 and the actuator 162 from the protruding state to the non-protruding state. In the example illustrated in FIG. 3, the actuator 161 and the actuator 162 are configured separately, but may be configured integrally. The detection unit 16 may be configured to include either the actuator 161 or the actuator 162. The detection unit 16 may be configured to include one or more actuators in addition to the actuator 161 and the actuator 162. If at least one of the actuator 161 and the actuator 162 is changed from the protruding state to the non-protruding state, the detection unit 16 outputs a signal indicating that the top surface is detected to the control unit 15. The detection unit 16 may be configured to continuously output a signal indicating that the top surface is not detected to the control unit 15 if both the actuator 161 and the actuator 162 are in the protruding state. In this case, if at least one of the actuator 161 and the actuator 162 is changed from the protruding state to the non-protruding state, the detection unit 16 notifies the control unit 15 that the top surface is detected by stopping the output of the signal.

For convenience of explanation, an upstream side (image forming apparatus 2 side) of the print medium S in a conveyance direction will be referred to simply as the upstream side. For convenience of explanation, a downstream side (discharge unit 14 side) of the print medium S in the conveyance direction will be referred to simply as the downstream side. For convenience of explanation, the downstream end portion of the end portions of the print medium S will be referred to as a tip end portion. For convenience of explanation, the upstream end portion of the end portions of the print medium S will be referred to as a rear end portion. For convenience of explanation, a direction parallel to a plane of the print medium S and orthogonal to the conveyance direction of the print medium S will be referred to as a print medium width direction W.

Next, a more detailed configuration of the standby unit 12 will be described.

The rear end portion of the standby tray 121 of the standby unit 12 is located in the vicinity of the outlet roller 1121 and the outlet roller 1122. The rear end portion of the standby tray 121 is located below the print medium carry-out port 112 of the conveyance path 11. The standby tray 121 is inclined with respect to the horizontal direction so that the height of the standby tray 121 gradually increases toward the downstream side in the conveyance direction of the print medium S. In the standby tray 121, one or more sheets of print media S are put on top of each other and made to stand by while the post-processing is performed by the processing unit 13.

The standby tray 121 includes a pair of tray members that can approach and separate from each other in the print medium width direction W. If the print medium S is on standby in the standby tray 121, the pair of tray members approach each other and support the print medium S. If the print medium S is moved from the standby tray 121 toward the processing tray 131 of the processing unit 13, the pair of tray members are separated from each other. With this configuration, the standby tray 121 drops (moves) the supported print medium S toward the processing tray 131.

A paddle unit 20 is provided between the upstream side of the standby tray 121 and the upstream side of the processing tray 131. The paddle unit 20 pushes the print medium S toward the processing tray 131 by rotating around a rotation axis along the print medium width direction W. If the print medium S moves from the standby tray 121 toward the processing tray 131, the paddle unit 20 pushes the rear end portion of the print medium S toward the processing tray 131. The paddle unit 20 includes a paddle 201 formed of an elastic material such as rubber, and the paddle 201 pushes the rear end portion of the print medium S against the processing tray 131.

Next, a more detailed configuration of the processing unit 13 will be described. In addition to the processing tray 131, the processing unit 13 includes a horizontal alignment plate 132, a rear end stopper 133, a stapler 134, an ejector 135, a thruster 136, a bundle pawl belt 137, and a vertical alignment roller 138. The bundle pawl belt 137 includes a bundle pawl 1371, a belt pulley 1372, and a belt pulley 1373.

The processing tray 131 is provided below the standby tray 121. The processing tray 131 is inclined with respect to the horizontal direction so that the height of the processing tray 131 gradually increases toward the downstream side in the conveyance direction of the print medium. The processing tray 131 is inclined parallel to, for example, the standby tray 121. The processing tray 131 has a conveyance surface 1311 that supports the print medium S (on which the print medium S is placed).

A pair of horizontal alignment plates 132 are provided so as to face each other on both sides of the conveyance surface 1311 of the processing tray 131 in the print medium width direction W. The pair of horizontal alignment plates 132 are provided away from each other in the print medium width direction W. The horizontal alignment plate 132 can move in a direction approaching each other and in a direction away from each other in the print medium width direction W. The horizontal alignment plate 132 configures a horizontal alignment device that aligns (horizontally aligns) the print medium S in the print medium width direction W.

The rear end stopper 133 is provided at an end portion on the upstream side of the processing tray 131. The print medium S placed on the processing tray 131 is conveyed toward the rear end stopper 133 by the vertical alignment roller 138 being driven to rotate in a reverse direction clockwise in the drawing (that is, clockwise toward the negative direction of the X-axis). The vertical alignment roller 138 cooperates with the paddle unit 20 to bring an end on the upstream side of the print medium S into contact with the rear end stopper 133, and thus a vertical alignment of the print medium S is performed. The vertical alignment roller 138 stretches a thin and lightweight print medium S, a curved print medium S, and the like in cooperation with the paddle unit 20 that pushes the rear end portion of the print medium S by the vertical alignment roller 138 being driven to rotate in a forward direction counterclockwise in the drawing (that is, counterclockwise toward the negative direction of the X-axis).

The stapler 134 is disposed behind the processing tray 131. The stapler 134 includes a staple clincher 1341. The stapler 134 can clinch an end portion of the print medium bundle SS aligned in contact with the rear end stopper 133. The stapler 134 staples the end portion of the print medium bundle SS aligned in contact with the rear end stopper 133 by the staple clincher 1341. The stapler 134 can be moved within a prescribed range so as to staple the position instructed by the user on the print medium bundle SS via the control panel.

The ejector 135 is provided at an initial position of the end portion on the upstream side of the processing tray 131. The ejector 135 is provided so as to overlap the rear end stopper 133 in a side view. The ejector 135 can move the print medium S toward the downstream side in the conveyance direction. If the ejector 135 moves to the downstream side in the conveyance direction, the ejector 135 advances the print medium bundle SS which is subjected to the post-processing. The ejector 135 disposes the end portion of the print medium bundle SS at a position where the print medium bundle SS can be delivered to the bundle pawl 1371 of the bundle pawl belt 137. The ejector 135 is urged toward the initial position before the movement described above.

The bundle pawl belt 137 is stretched between a pair of belt pulley 1372 and belt pulley 1373 located on the upstream side and the downstream side in the conveyance direction of the processing tray 131. The bundle pawl 1371 is a member that pushes the print medium S located on the bundle pawl belt 137 outward from the discharge port 19 in response to the rotation of the bundle pawl belt 137. The bundle pawl drive mechanism 21 for driving the bundle pawl 1371 is configured with the bundle pawl belt 137, the belt pulley 1372, and the belt pulley 1373. The bundle pawl drive mechanism 21 includes a bundle pawl drive motor 22 as a drive source shared by the bundle pawl 1371, the ejector 135, and the thruster 136. The bundle pawl drive motor 22 is always connected to the belt pulley 1372, but is connected to the ejector 135 and the thruster 136 so as to be able to connect and disconnect via an electromagnetic clutch 23. The bundle pawl drive mechanism 21 is an example of a conveyance unit.

If the belt pulley 1372 is driven to rotate in the forward direction counterclockwise in the drawing (that is, counterclockwise toward the negative direction of the X-axis), each of the bundle pawl 1371, the ejector 135, and the thruster 136 moves on the conveyance surface 1311 of the processing tray 131 from the upstream side to the downstream side in the conveyance direction (in FIG. 2, the negative direction side of the Y-axis). If the belt pulley 1372 is driven to rotate in the reverse direction clockwise in the drawing (that is, clockwise toward the negative direction of the X-axis), each of the bundle pawl 1371, the ejector 135, and the thruster 136 moves on the conveyance surface 1311 of the processing tray 131 to the upstream side in the conveyance direction (in FIG. 2, the positive direction side of the Y-axis).

The vertical alignment roller 138 is driven to rotate in the forward direction counterclockwise in the drawing (that is, counterclockwise toward the negative direction of the X-axis), and thus the print medium S placed on the processing tray 131 is conveyed toward the movable tray 141 of the discharge unit 14. The vertical alignment roller 138 applies a driving force to the print medium S by contacting the print medium S placed on the processing tray 131 from below.

Next, a more detailed configuration of the control unit 15 illustrated in FIG. 1 will be described.

The control unit 15 instructs the processing unit 13 to align. The aligning is a process of aligning the positions of the end portions of the plurality of print media S in the width direction and the length direction. If the processing unit 13 aligns, the horizontal alignment plate 132 and the vertical alignment roller 138 operate to align the positions of the end portions of the plurality of print media S in the width direction and the length direction. The length direction of the print medium S is a print medium surface direction and a direction along the conveyance direction of the print medium.

The control unit 15 instructs the stapler 134 to execute post-processing. The stapler 134 receiving the instruction to execute the post-processing executes the post-processing on the print medium bundle SS.

The control unit 15 instructs the ejector 135 to eject a paper. The ejector 135 receiving the instruction to eject the paper ejects the print medium bundle SS subjected to the post-processing to the outside of the post-processing apparatus 3.

The control unit 15 controls the bundle pawl drive mechanism 21 so that the end portion of the print medium bundle SS supplied from the ejector 135 to the bundle pawl belt 137 is received by the bundle pawl 1371 of the bundle pawl belt 137. The control unit 15 discharges the print medium bundle SS received by the bundle pawl 1371 to the bundle pawl 1371 from the discharge port 19 by rotating the bundle pawl belt 137.

The control unit 15 controls the elevation unit 143 and holds a relative position of the top surface with respect to the discharge port 19 if the print medium bundle SS is discharged from the discharge port 19 at a predetermined first position. The first position is a position a predetermined distance X below the position where the top surface and the actuator 161 and the actuator 162 come into contact with each other. The predetermined distance X is about several millimeters, but is not limited thereto.

The control unit 15 lowers the movable tray 141 to the lowermost position if the print medium S is discharged from the discharge port 19, and then raises the movable tray 141 until the top surface is detected by the detection unit 16. The detection unit 16 detects the top surface by changing at least one of the actuator 161 and the actuator 162 from the protruding state to the non-protruding state by the top surface. If the detection unit 16 detects the top surface by raising the movable tray 141, the control unit 15 lowers the movable tray 141 by a predetermined distance X. With this configuration, the control unit 15 holds the relative position of the top surface with respect to the discharge port 19 at the first position. The control unit 15 may perform such a process of holding the position of the top surface at the first position each time the print medium S is discharged from the discharge port 19, or may perform the process each time a predetermined number of sheets of print media S are discharged from the discharge port 19. The predetermined number of sheets is about several number of sheets, but is not limited thereto.

In the post-processing apparatus 3 having the configuration described above, if the print medium S stacked on the movable tray 141 is curled downward, excessive projection of the print medium S discharged from the discharge port 19 may occur. On the other hand, in the post-processing apparatus 3, if the print medium S stacked on the movable tray 141 is curled upward, rising of the rear end of the print medium S discharged from the discharge port 19 may occur.

Figure 4:
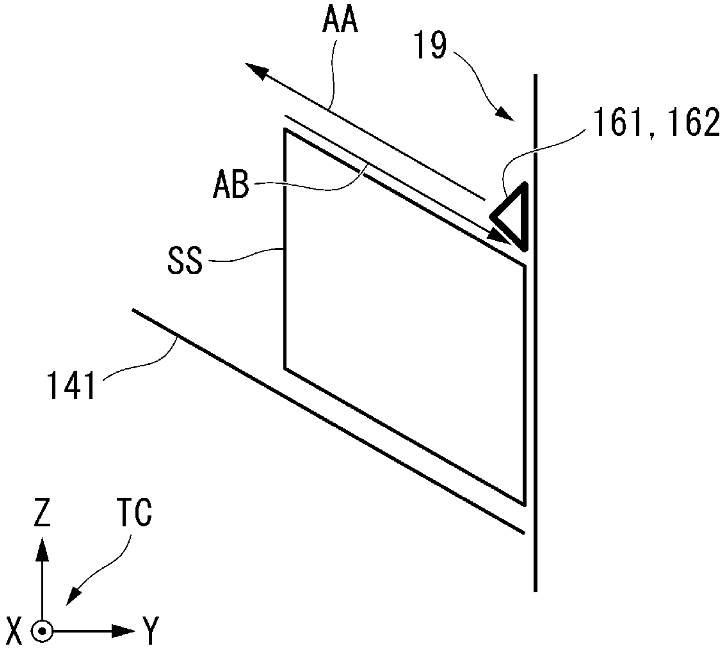
FIG. 4 is a diagram illustrating an example of movement of the print medium S discharged from a discharge port 19.

FIG. 4 is a diagram illustrating an example of the movement of the print medium S discharged from the discharge port 19. In the post-processing apparatus 3, if the print medium S stacked on the movable tray 141 is not curled upward and downward, the print medium S discharged from the discharge port 19 moves as illustrated in FIG. 4, for example. That is, in this case, the print medium S discharged from the discharge port 19 moves in the discharge direction along a path as indicated by an arrow AA. After that, the print medium S moves in the direction opposite to the discharge direction along a path as indicated by an arrow AB. This movement continues until the print medium S collides with the discharge surface. The print medium S pushes the actuator 161 and the actuator 162 in the direction opposite to the discharge direction until the print medium S collides with the discharge surface. With this configuration, the post-processing apparatus 3 can cause the detection unit 16 that detects the top surface to detect the print medium S discharged from the discharge port 19. As a result, the control unit 15 can specify that the discharge of the print medium S from the discharge port 19 is completed. In this way, in the post-processing apparatus 3, the print medium S discharged from the discharge port 19 is stacked on the movable tray 141. Such movement of the print medium S discharged from the discharge port 19 is almost unchanged unless the print medium S stacked on the movable tray 141 is curled upward and also curled downward.

Figure 5:
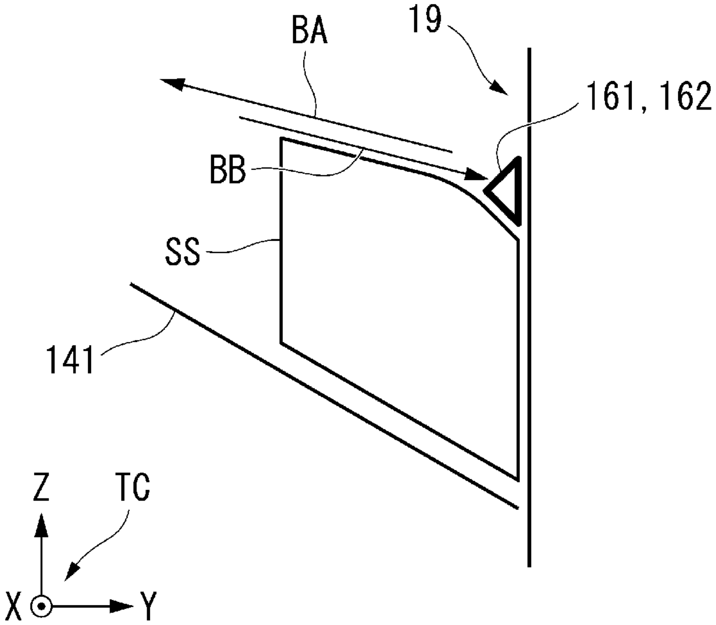
FIG. 5 is a diagram illustrating another example of the movement of the print medium S discharged from the discharge port 19.

FIG. 5 is a diagram illustrating another example of the movement of the print medium S discharged from the discharge port 19. In the post-processing apparatus 3, if the print medium S stacked on the movable tray 141 is curled downward, the print medium discharged from the discharge port 19 moves as illustrated in FIG. 5, for example. That is, if the print medium S stacked on the movable tray 141 is curled downward, the print medium S discharged from the discharge port 19 is discharged from the discharge port in the discharge direction along the path as indicated by an arrow BA. In this case, the print medium S may be excessively projected to the discharge direction side compared to if the print medium S stacked on the movable tray 141 is not curled upward or downward. This is represented in FIG. 5 by the length of the arrow BA being longer than the length of the arrow AA in FIG. 4. If such excessive projection of the print medium S occurs, the time required for the excessively projected print medium S to start moving in the direction opposite to the discharge direction becomes longer, or does not start moving in the direction opposite to the discharge direction. If the excessively projected print medium S starts to move in the direction opposite to the discharge direction, the print medium S moves in the direction opposite to the discharge direction along a path as indicated by an arrow BB. This movement continues until the print medium S collides with the discharge surface. The print medium S pushes the actuator 161 and the actuator 162 in the direction opposite to the discharge direction until the print medium S collides with the discharge surface.

Figure 6:
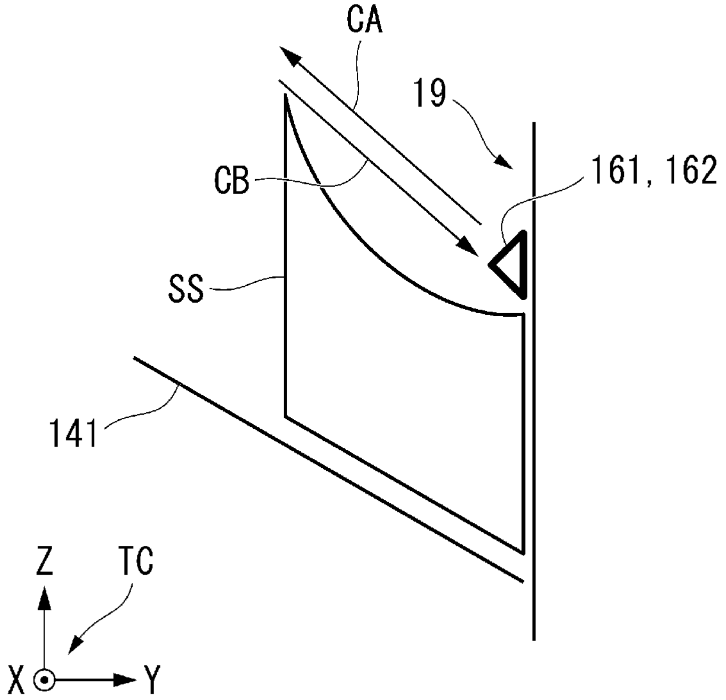
FIG. 6 is a diagram illustrating still another example of the movement of the print medium S discharged from the discharge port 19.

FIG. 6 is a diagram illustrating still another example of the movement of the print medium S discharged from the discharge port 19. In the post-processing apparatus 3, if the print medium S stacked on the movable tray 141 is curled upward, the print medium S discharged from the discharge port 19 moves as illustrated in FIG. 6, for example. That is, if the print medium S stacked on the movable tray 141 is curled upward, the print medium S discharged from the discharge port 19 is discharged from the discharge port in the discharge direction along a path as indicated by an arrow CA. In this case, the projection amount of the print medium S in the discharge direction may be small compared to if the print medium S stacked on the movable tray 141 is not curled upward or downward. This is represented in FIG. 6 by the length of the arrow CA being shorter than the length of the arrow AA in FIG. 4. If the projection amount of the print medium S in the discharge direction is insufficient, the time required for the print medium S having an insufficient projection amount to start moving in the direction opposite to the discharge direction is shortened. If the print medium S having an insufficient projection amount starts to move in the direction opposite to the discharge direction, the print medium S moves in the direction opposite to the discharge direction along a path as indicated by an arrow CB. This movement continues until the print medium S collides with the discharge surface. The print medium S pushes the actuator 161 and the actuator 162 in the direction opposite to the discharge direction until the print medium S collides with the discharge surface.

The occurrence of the events illustrated in FIGS. 5 and 6 is not preferable because the occurrence of the events causes defective alignment of the print medium S on the movable tray 141, a paper jam of the print medium S discharged from the discharge port 19, and the like.

Therefore, in the post-processing apparatus 3, if the discharge time is a first time, the control unit 15 causes the bundle pawl drive mechanism 21 to convey the print medium S at a first speed. The discharge time is the time from a first timing to a second timing. The first timing indicates the timing relating to the discharge of the print medium S from the discharge port 19. The second timing indicates the timing at which the print medium S is detected by the detection unit 16 after the first timing. That is, the second timing indicates the timing at which the actuator 161 and the actuator 162 are pushed in the direction opposite to the discharge direction on the movable tray 141 in the process in which the print medium S discharged from the discharge port 19 moves in the direction opposite to the discharge direction. The first speed is a speed predetermined as a standard speed. On the other hand, if the discharge time is a second time longer than the first time, the control unit 15 causes the bundle pawl drive mechanism 21 to convey the print medium S at a second speed slower than the first speed. On the other hand, if the discharge time is a third time shorter than the first time, the control unit 15 causes the bundle pawl drive mechanism 21 to convey the print medium S at a third speed faster than the first speed. With this configuration, the control unit 15 can prevent excessive projection and insufficient projection of the print medium S discharged from the discharge port 19. As a result, the control unit 15 can prevent the occurrence of defective alignment of the print medium S discharged from the discharge port 19 and paper jam of the print medium S discharged from the discharge port 19, and the like. That is, the control unit 15 can prevent the occurrence of troubles caused by the discharge of the print medium S from the discharge port 19. The control unit 15 may be configured to either change the speed at which the print medium S is conveyed by the bundle pawl drive mechanism 21 to the second speed or change the speed at which the print medium S is conveyed by the bundle pawl drive mechanism 21 to the third speed.

The control unit 15 changes the speed at which the print medium S is conveyed by the bundle pawl drive mechanism 21 by changing the number of pulses of a pulse width modulation (PWM) signal supplied to the bundle pawl drive motor 22, for example.

The speed at which the print medium S is conveyed by the bundle pawl drive mechanism 21 may be represented by the number of pulses of the PWM signal supplied to the bundle pawl drive motor 22. The speed at which the print medium S is conveyed by the bundle pawl drive mechanism 21 may be represented by a rotation speed of the bundle pawl belt 137. The speed at which the print medium S is conveyed by the bundle pawl drive mechanism 21 may be represented by a moving speed of the bundle pawl 1371. The speed at which the print medium S is conveyed by the bundle pawl drive mechanism 21 may be represented by the discharge speed of the print medium bundle SS discharged by the bundle pawl 1371. The speed at which the print medium S is conveyed by the bundle pawl drive mechanism 21 may be represented by another speed.

The first timing may be the timing at which the bundle pawl 1371 starts to move if the bundle pawl 1371 receives the end portion of the print medium bundle SS. The first timing may be the timing at which the bundle pawl drive motor 22 starts to drive if the bundle pawl 1371 receives the end portion of the print medium bundle SS. The first timing may be the timing at which the sensor that detects the passage of the print medium bundle SS through the discharge port 19 detects that the print medium bundle SS passes through the discharge port 19. The first timing may be the timing at which the sensor that detects the passage of the print medium S through the inlet roller 1111 and the inlet roller 1112 detects that the print medium S passes through the inlet roller 1111 and the inlet roller 1112. The first timing may be another timing relating to the discharge of the print medium S from the discharge port 19.

The second timing may be another timing instead of the timing when the print medium S discharged from the discharge port 19 pushes the actuator 161 and the actuator 162. For example, the second timing may be the timing at which the print medium S is detected by a sensor (for example, an optical sensor) that detects that the print medium S discharged from the discharge port 19 is stacked on the movable tray 141.

If the image forming apparatus 2 ends the supply of the print medium S, the control unit 15 stores speed information indicating the speed at which the print medium S finally supplied from the image forming apparatus 2 is conveyed by the bundle pawl drive mechanism 21 in the storage unit 153. With this configuration, if the image forming apparatus 2 starts supplying the print medium S and if one or more sheets of print media S are stacked on the movable tray 141, the control unit 15 can read the speed information from the storage unit 153 and set the speed indicated by the read speed information as the speed at which the bundle pawl drive mechanism 21 conveys the print medium S. As a result, the post-processing apparatus 3 can prevent the change in the speed at which the bundle pawl drive mechanism 21 conveys the print medium S even though a state of the print medium S on the movable tray 141 is not changed. That is, the post-processing apparatus 3 can cause the bundle pawl drive mechanism 21 to convey the print medium S at an appropriate speed according to the state of the print medium S stacked on the movable tray 141.

Figure 7:
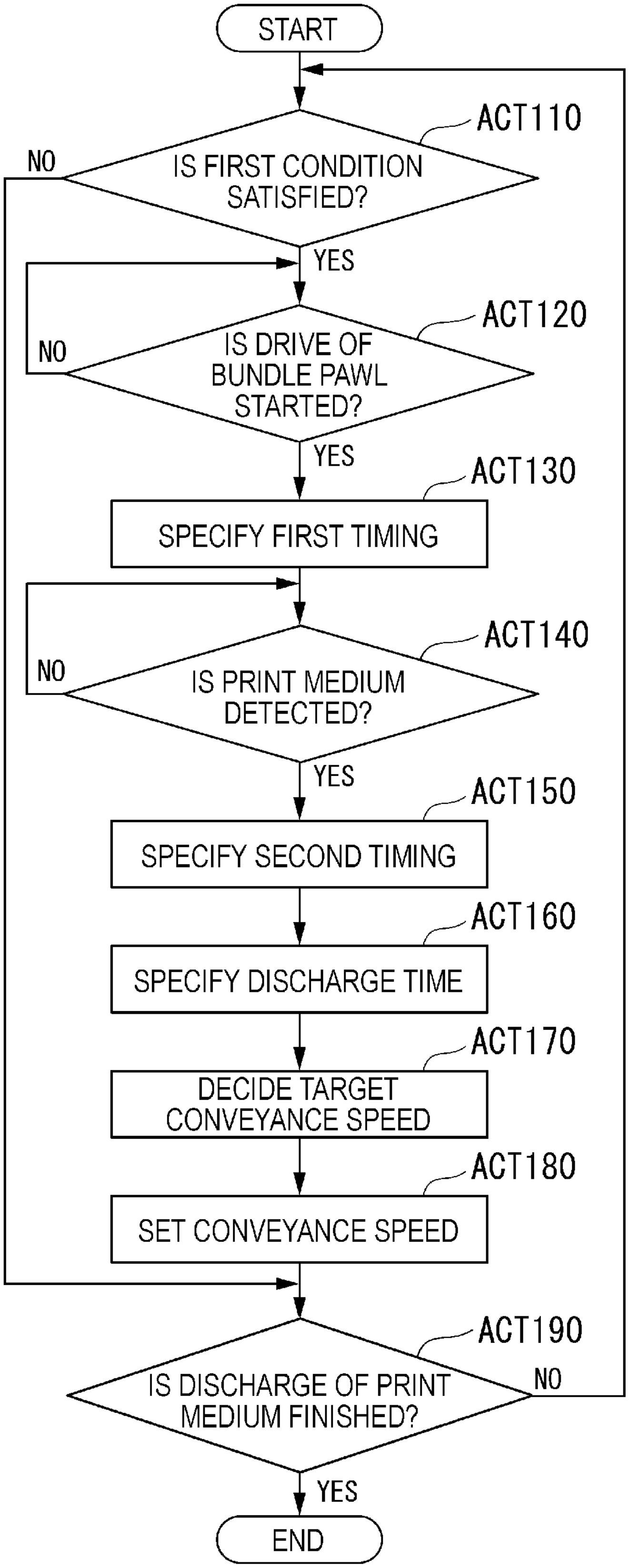
FIG. 7 is a diagram illustrating an example of a flow of a process of changing, by a control unit 15, a speed at which the print medium S is conveyed by a bundle pawl drive mechanism 21.

FIG. 7 is a diagram illustrating an example of a flow of a process of changing, by the control unit 15, the speed at which the print medium S is conveyed by the bundle pawl drive mechanism 21. As an example, a case where the supply of the print medium S from the image forming apparatus 2 to the post-processing apparatus 3 is started at the timing before a process of ACT 110 illustrated in FIG. 7 is performed will be described. That is, as an example, a case where the image forming apparatus 2 starts forming an image on the print medium S at the timing before the process of ACT 110 illustrated in FIG. 7 is performed will be described. The image forming apparatus 2 starts forming an image on each of one or more sheets of print media S by receiving a print job from an external device or the like.

The control unit 15 determines whether or not a predetermined first condition is satisfied (ACT 110). The first condition is a trigger condition that starts the process of changing, by the control unit 15, the speed at which the print medium S is conveyed by the bundle pawl drive mechanism 21.

The first condition is, for example, that the print medium S is supplied from the image forming apparatus 2. In this case, the control unit 15 determines that the first condition is satisfied each time the print media S is supplied one by one from the image forming apparatus 2.

The first condition may be another condition as long as the first condition is a trigger condition that starts the process of changing, by the control unit 15, the speed at which the print medium S is conveyed by the bundle pawl drive mechanism 21. The first condition may be, for example, that a predetermined number of sheets of print media S are discharged from the discharge port 19. In this case, the control unit 15 determines that the first condition is satisfied each time the predetermined number of sheets of print media S is discharged from the discharge port 19. The first condition may be, for example, that the image forming apparatus 2 receives a print job. In this case, the control unit 15 determines that the first condition is satisfied each time a signal indicating that the supply of the print medium S according to the print job is started is acquired from the image forming apparatus 2.

If it is determined that the first condition is not satisfied (NO in ACT 110), the control unit 15 determines whether or not the discharge of the print medium S from the discharge port 19 is finished (ACT 190). In ACT 190, for example, if all the print media S supplied by the image forming apparatus 2 are discharged from the discharge port 19, the control unit 15 determines that the discharge of the print medium S from the discharge port 19 is finished. On the other hand, in ACT 190, for example, if at least a part of all the print media S supplied by the image forming apparatus 2 is not discharged from the discharge port 19, the control unit 15 determines that the discharge of the print medium S from the discharge port 19 is not finished.

If it is determined that the discharge of the print medium S from the discharge port 19 is not finished (NO in ACT 190), the control unit 15 transitions to ACT 110 and determines again whether or not the first condition is satisfied.

On the other hand, if it is determined that the discharge of the print medium S from the discharge port 19 is finished (YES in ACT 190), the control unit 15 ends the process of the flowchart illustrated in FIG. 7.

On the other hand, in ACT 110, if it is determined that the first condition is satisfied (YES in ACT 110), the control unit 15 waits until the drive of the bundle pawl 1371 is started (ACT 120). In ACT 120, if the control unit 15 starts supplying the PWM signal to the bundle pawl drive motor 22, the control unit 15 determines that the drive of the bundle pawl 1371 is started. On the other hand, if the control unit 15 does not start supplying the PWM signal to the bundle pawl drive motor 22, the control unit 15 determines that the drive of the bundle pawl 1371 is not started.

If the drive of the bundle pawl 1371 is started (YES in ACT 120), the control unit 15 specifies the current time as the first timing (ACT 130).

Next, the control unit 15 waits until the detection unit 16 detects the print medium S (ACT 140).

If the detection unit 16 detects the print medium S (YES in ACT 140), the control unit 15 specifies the current time as the second timing (ACT 150).

Next, the control unit 15 specifies the time from the first timing specified in ACT 130 to the second timing specified in ACT 150 as the discharge time (ACT 160).

Next, the control unit 15 decides the speed, which is to be set as the speed at which the print medium S is conveyed by the bundle pawl drive mechanism 21, as a target conveyance speed based on the discharge time specified in ACT 160 (ACT 170). In ACT 170, for example, if the discharge time is within a predetermined range, the control unit 15 determines that the discharge time is the first time, and decides the first speed as the target conveyance speed. The predetermined range is a range including the first time, for example, a range of about ±10% of the first time, but is not limited thereto. In ACT 170, for example, if the discharge time exceeds an upper limit of the predetermined range, the control unit 15 determines that the discharge time is the second time, and decides the second speed as the target conveyance speed. In ACT 170, for example, if the discharge time is less than a lower limit of the predetermined range, the control unit 15 determines that the discharge time is the third time, and decides the third speed as the target conveyance speed.

Next, the control unit 15 sets the target conveyance speed decided in ACT 170 as the speed at which the print medium S is conveyed by the bundle pawl drive mechanism 21 (ACT 180). With this configuration, the post-processing apparatus 3 can prevent excessive projection and insufficient projection of the print medium S discharged from the discharge port 19. As a result, the post-processing apparatus 3 can prevent the occurrence of the defective alignment of the print medium S discharged from the discharge port 19, the paper jam of the print medium S discharged from the discharge port 19, and the like. That is, the post-processing apparatus 3 can prevent the occurrence of troubles caused by the discharge of the print medium S from the discharge port 19.

Figure 8:
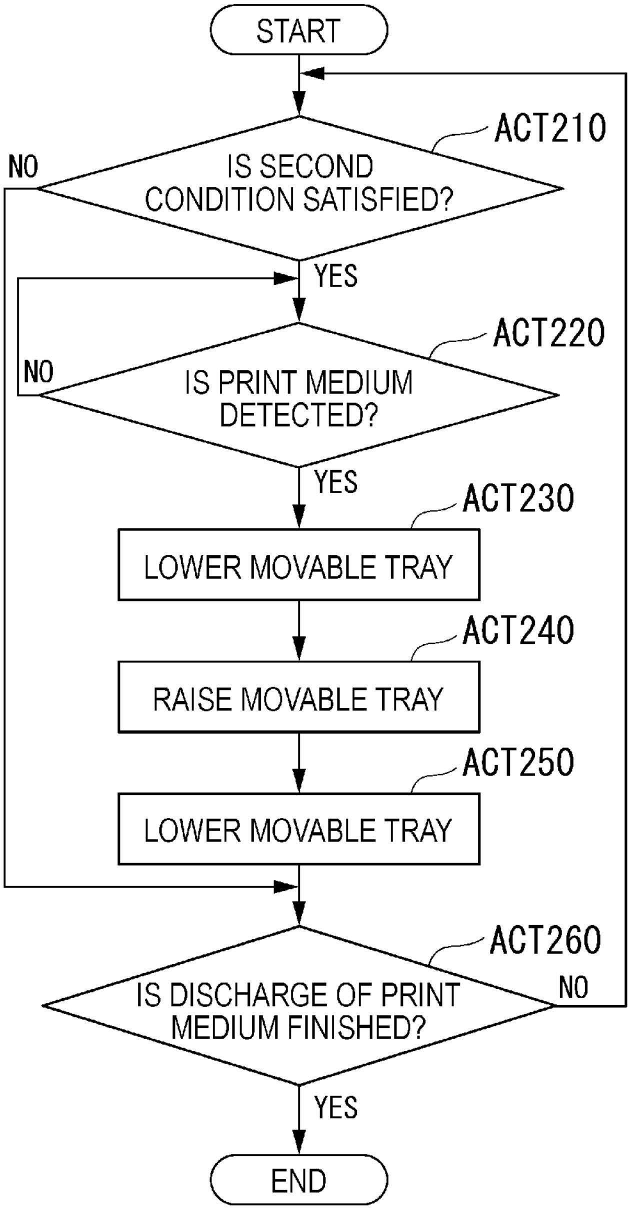
FIG. 8 is a diagram illustrating an example of a flow of a process of holding, by the control unit 15, a top surface at a first position.

FIG. 8 is a diagram illustrating an example of a flow of a process of holding, by the control unit 15, the top surface at the first position. As an example, a case where the supply of the print medium S from the image forming apparatus 2 to the post-processing apparatus 3 is started at the timing before a process of ACT 210 illustrated in FIG. 8 is performed will be described. That is, as an example, a case where the image forming apparatus 2 starts forming an image on the print medium S at the timing before the process of ACT 210 illustrated in FIG. 8 is performed will be described. The image forming apparatus 2 starts forming an image on each of one or more sheets of print media S by receiving a print job from an external device or the like.

The control unit 15 determines whether or not a predetermined second condition is satisfied (ACT 210). The second condition is a trigger condition that starts the process of holding the top surface at the first position.

The second condition is, for example, that a predetermined number of sheets of print media S is discharged from the discharge port 19. In this case, the control unit 15 determines that the second condition is satisfied each time the predetermined number of sheets of print media S are discharged from the discharge port 19.

The second condition may be another condition as long as the second condition is a trigger condition that starts the process of holding the top surface at the first position. The second condition may be, for example, that the print medium S is supplied from the image forming apparatus 2. In this case, the control unit 15 determines that the second condition is satisfied each time the image forming apparatus 2 supplies the print media S one by one.

If it is determined that the second condition is not satisfied (NO in ACT 210), the control unit 15 determines whether or not the discharge of the print medium S from the discharge port 19 is finished (ACT 260). In ACT 260, for example, if all the print media S supplied by the image forming apparatus 2 are discharged from the discharge port 19, the control unit 15 determines that the discharge of the print medium S from the discharge port 19 is finished. On the other hand, in ACT 260, for example, if at least a part of all the print media S supplied by the image forming apparatus 2 is not discharged from the discharge port 19, the control unit 15 determines that the discharge of the print medium S from the discharge port 19 is not finished.

If it is determined that the discharge of the print medium S from the discharge port 19 is not finished (NO in ACT 260), the control unit 15 transitions to ACT 210 and determines again whether or not the second condition is satisfied.

On the other hand, if it is determined that the discharge of the print medium S from the discharge port 19 is finished (YES in ACT 260), the control unit 15 ends the process of the flowchart illustrated in FIG. 8.

On the other hand, in ACT 210, if it is determined that the second condition is satisfied (YES in ACT 210), the control unit 15 waits until the detection unit 16 detects the print medium S (ACT 220).

If the detection unit 16 detects the print medium S (YES in ACT 220), the control unit 15 lowers the movable tray 141 to the lowermost position (ACT 230).

Next, the control unit 15 raises the movable tray 141 until the top surface is detected by the detection unit 16 (ACT 240).

Next, the control unit 15 lowers the movable tray 141 by a predetermined distance X (ACT 250). With this configuration, the post-processing apparatus 3 can move the position of the top surface to the first position.

After the process of ACT 250 is performed, the control unit 15 transitions to ACT 260 and determines again whether or not the discharge of print medium S from the discharge port 19 is finished.

By the process described above, the post-processing apparatus 3 can hold the top surface at the first position. As a result, the post-processing apparatus 3 can prevent the movement of the print medium S discharged from the discharge port 19 from being disturbed according to the thickness of the print medium S stacked on the movable tray 141. As a result, the post-processing apparatus 3 can more reliably prevent the occurrence of troubles caused by the discharge of the print medium S from the discharge port 19.

Figure 9:
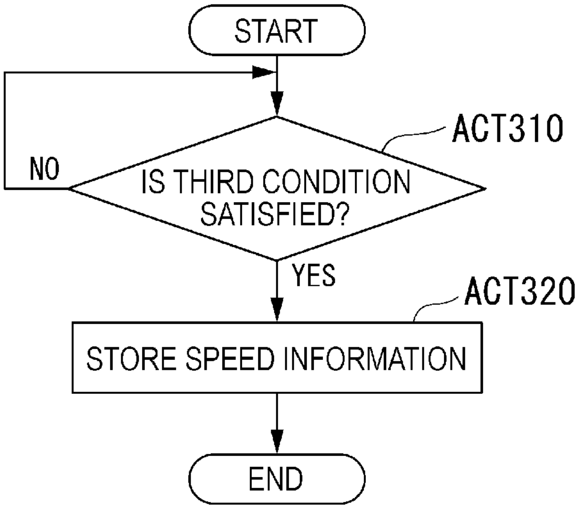
FIG. 9 is a diagram illustrating an example of a flow of a process of storing speed information indicating the speed at which the print medium S is conveyed by the bundle pawl drive mechanism 21.

FIG. 9 is a diagram illustrating an example of a flow of a process of storing speed information indicating the speed at which the print medium S is conveyed by the bundle pawl drive mechanism 21. As an example, a case where the supply of the print medium S from the image forming apparatus 2 to the post-processing apparatus 3 is started at the timing before a process of ACT 310 illustrated in FIG. 9 is performed will be described. That is, as an example, a case where the image forming apparatus 2 starts forming an image on the print medium S at the timing before the process of ACT 310 illustrated in FIG. 9 is performed will be described. The image forming apparatus 2 starts forming an image on each of one or more sheets of print media S by receiving a print job from an external device or the like.

The control unit 15 waits until a predetermined third condition is satisfied (ACT 310). The third condition is a trigger condition that starts the process of storing the speed information.

The third condition is, for example, that the image forming apparatus 2 ends the supply of the print medium S. In this case, for example, if the image forming apparatus 2 acquires a signal indicating that the supply of the print medium S is ended from the image forming apparatus 2, the control unit 15 determines that the third condition is satisfied.

The third condition may be another condition as long as the third condition is a trigger condition that starts the process of storing the speed information. The third condition may be that all the print media S supplied by the image forming apparatus 2 are discharged from the discharge port 19. In this case, the control unit 15 determines that the third condition is satisfied each time it is determined that all the print media S supplied by the image forming apparatus 2 are discharged from the discharge port 19. The third condition may be, for example, that the print medium S is supplied from the image forming apparatus 2. In this case, the control unit 15 determines that the third condition is satisfied each time the print media S is supplied one by one from the image forming apparatus 2.

If it is determined that the third condition is satisfied (YES in ACT 310), the control unit 15 stores information indicating the speed at which the bundle pawl drive mechanism 21 conveys the print medium S finally supplied from the image forming apparatus 2 in the storage unit 153 as speed information (ACT 320). After that, the control unit 15 ends the process of the flowchart illustrated in FIG. 9.

Figure 10:
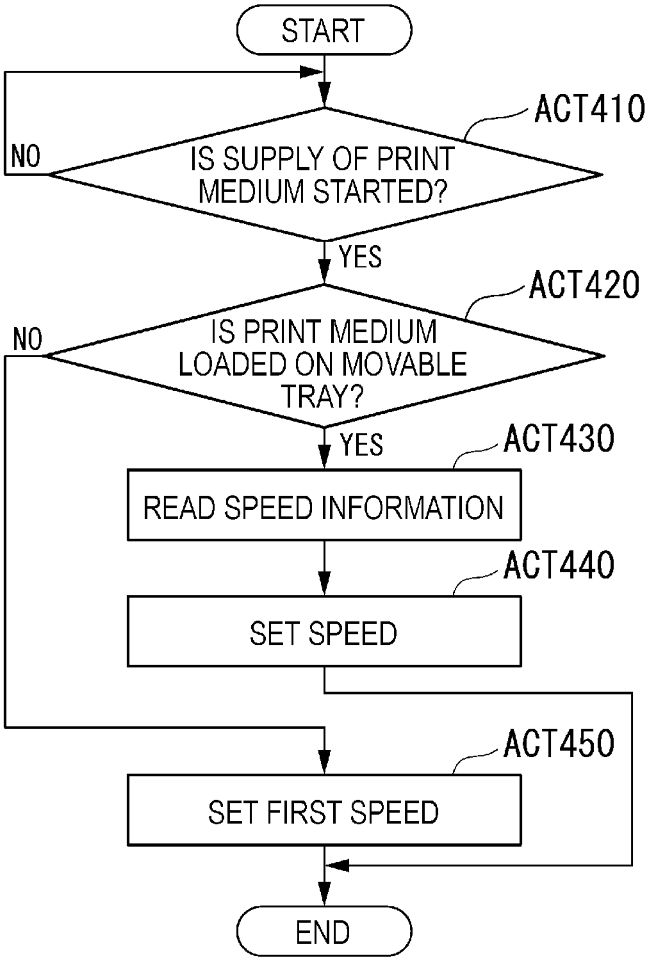
FIG. 10 is a diagram illustrating an example of a flow of a process of reading speed information.

FIG. 10 is a diagram illustrating an example of a flow of a process of reading speed information.

The control unit 15 waits until the supply of the print medium S from the image forming apparatus 2 to the post-processing apparatus 3 is started (ACT 410).

If it is determined that the supply of the print medium S from the image forming apparatus 2 to the post-processing apparatus 3 is started (YES in ACT 410), the control unit 15 determines whether or not one or more sheets of print media S are stacked on the movable tray 141 (ACT 420). In ACT 420, if the control unit 15 acquires, for example, a signal indicating that one or more sheets of print media S are stacked on the movable tray 141 from a sensor provided in the movable tray 141, the control unit 15 determines that one or more sheets of print media S are stacked on the movable tray 141. On the other hand, in ACT 420, for example, if the signal indicating that one or more sheets of print media S are stacked on the movable tray 141 is not acquired, the control unit 15 determines that one or more sheets of print media S are not stacked on the movable tray 141.

If it is determined that one or more print media S are not stacked on the movable tray 141 (NO in ACT 410), the control unit 15 sets the first speed as the speed at which the bundle pawl drive mechanism 21 conveys the print medium S (ACT 450). After that, the control unit 15 ends the process of the flowchart illustrated in FIG. 10.

On the other hand, if it is determined that one or more sheets of print media S are stacked on the movable tray 141 (YES in ACT 410), the control unit 15 reads the speed information stored in the storage unit 153 from the storage unit 153 (ACT 430).

Next, the control unit 15 sets the speed indicated by the speed information read in ACT 430 as the speed at which the bundle pawl drive mechanism 21 conveys the print medium S (ACT 440). After that, the control unit 15 ends the process of the flowchart illustrated in FIG. 10.

By the processes described in FIGS. 9 and 10, the post-processing apparatus 3 can prevent the change in the speed at which the bundle pawl drive mechanism 21 conveys the print medium S even though the state of the print medium S on the movable tray 141 is not changed. That is, the post-processing apparatus 3 can cause the bundle pawl drive mechanism 21 to convey the print medium S at an appropriate speed according to the state of the print medium S stacked on the movable tray 141.

In the example described above, the control unit 15 may be configured to change the speed at which the bundle pawl drive mechanism 21 conveys the print medium S while changing the speed in two or more steps when changing the speed at which the bundle pawl drive mechanism 21 conveys the print medium S. In this case, for example, if the discharge time is the first time, the control unit 15 causes the speed at which the bundle pawl drive mechanism 21 conveys the print medium S to reach the first speed while changing the speed at which the bundle pawl drive mechanism 21 conveys the print medium S in two or more steps. In this case, for example, if the discharge time is the second time, the control unit 15 causes the speed at which the bundle pawl drive mechanism 21 conveys the print medium S to reach the second speed while changing the speed at which the bundle pawl drive mechanism 21 conveys the print medium S in two or more steps. In this case, for example, if the discharge time is the third time, the control unit 15 causes the speed at which the bundle pawl drive mechanism 21 conveys the print medium S to reach the third speed while changing the speed at which the bundle pawl drive mechanism 21 conveys the print medium S in two or more steps.

In the example described above, the control unit 15 changes the speed at which the bundle pawl drive mechanism 21 conveys the print medium S in three steps according to which of three types of time of the first time, the second time, and the third time is the discharge time. Instead of the three steps, the control unit 15 may be configured to change the speed at which the bundle pawl drive mechanism 21 conveys the print medium S in four or more steps according to which of four or more types of time is the discharge time.

As described above, the post-processing apparatus (in the example described above, the post-processing apparatus 3) includes a conveyance unit (in the example described above, the bundle pawl drive mechanism 21), a discharge port (in the example described above, the discharge port 19), a tray (in the example described above, the movable tray 141), an elevation unit (in the example described above, the elevation unit 143), a detection unit (in the example described above, the detection unit 16), and a control unit (in the example described above, the control unit 15). The conveyance unit conveys a print medium (in the example described above, the print medium S) supplied from an image forming apparatus (in the example described above, the image forming apparatus 2). The discharge port discharges the print medium conveyed by the conveyance unit. The tray is stacked with the print medium discharged from the discharge port and can be raised and lowered in the vertical direction. The elevation unit raises and lowers the tray in the vertical direction. The detection unit detects the top surface of the uppermost print medium of one or more sheets of the print media stacked on the tray. The control unit controls the conveyance unit and the elevation unit, and holds the relative position of the top surface with respect to the discharge port if the print medium is discharged from the discharge port at the first position. The control unit causes the conveyance unit to convey the print medium at a first speed if a discharge time from a first timing, which indicates the timing for the discharge of the print medium from the discharge port, to a second timing, which indicates the timing when the print medium is detected by the detection unit is a first time, and causes the conveyance unit to convey the print medium at a second speed different from the first speed if the discharge time is the second time. With this configuration, the post-processing apparatus can prevent the occurrence of troubles caused by the discharge of the print medium from the discharge port.

In the post-processing apparatus, a configuration in which, if the discharge time is a third time, the control unit causes the conveyance unit to convey the print medium at a third speed different from the first speed and the second speed may be adopted.

In the post-processing apparatus, a configuration in which the second time is longer than the first time, the second speed is slower than the first speed, the third time is shorter than the first time, and the third speed is faster than the first speed may be adopted.

In the post-processing apparatus, a configuration in which, if the discharge time is the first time, the control unit causes the speed at which the conveyance unit conveys the print medium to reach the first speed while changing the speed at which the conveyance unit conveys the print medium in two or more steps, and if the discharge time is the second time, the control unit causes the speed at which the conveyance unit conveys the print medium to reach the second speed while changing the speed at which the conveyance unit conveys the print medium in two or more steps may be adopted.

In the post-processing apparatus, a configuration in which the control unit specifies the discharge time each time the print medium is supplied from the image forming apparatus, and changes the speed at which the conveyance unit conveys the print medium according to the specified discharge time may be adopted.

In the post-processing apparatus, a configuration in which, if the image forming apparatus ends the supply of the print medium, the control unit stores the speed information indicating the speed at which the conveyance unit conveys the print medium finally supplied from the image forming apparatus in a storage unit (in the example described above, the storage unit 153) may be adopted.

In the post-processing apparatus, a configuration in which, if the image forming apparatus starts supplying the print medium and if one or more sheets of print media are stacked on the tray, the control unit can read the speed information from the storage unit and set the speed indicated by the read speed information as the speed at which the conveyance unit conveys the print medium may be adopted.

In the post-processing apparatus, a configuration in which the conveyance unit includes a belt (in the example described above, the bundle pawl belt 137) that conveys the print medium supplied from the image forming apparatus to the discharge port, a motor (in the example described above, the bundle pawl drive motor 22) that rotates the belt, and a bundle pawl (in the example described above, the bundle pawl 1371) which is provided on the belt and pushes the print medium located on the belt outward from the discharge port in response to the rotation of the belt may be adopted.

In the post-processing apparatus, a configuration in which the first timing indicates the timing when the bundle pawl starts to move may be adopted.

In the post-processing apparatus, a configuration in which the control unit, if the print medium is discharged from the discharge port, lowers the tray to the second position (in the example described above, the lowermost position) and then raises the tray until the top surface is detected by the detection unit, and after that, if the top surface is detected by the detection unit, lowers the tray by a first lowering amount (in the example described above, the predetermined distance X), thereby holding a relative position of the top surface with respect to the discharge port at the first position may be adopted.

In the post-processing apparatus, a configuration in which the detection unit includes actuators (in the example described above, the actuator 161 and the actuator 162) that protrude from a surface (in the example described above, the discharge surface) on which the tray is provided in a discharge direction, in which the print medium is discharged from the discharge port, and are pushed by the uppermost print medium of the print medium stacked on the movable tray 141 in a direction opposite to the discharge direction, and detects the top surface if the actuator is pushed in the direction opposite to the discharge direction may be adopted.

A program for implementing the functions of any configuration unit in the apparatus (for example, post-processing apparatus 3, image forming apparatus 2, and the like) described above may be recorded in a computer-readable recording medium, and the program may be read into a computer system and executed. The term "computer system" as used herein includes an operating system (OS) and hardware such as peripheral devices. The "computer-readable recording medium" refers to a portable medium such as a flexible disk, a magneto-optical disk, a ROM, a compact disk (CD)-ROM, or a storage device such as a hard disk embedded in the computer system. Furthermore, the "computer-readable recording medium" includes a medium, which holds the program for a certain period of time, such as a volatile memory (RAM) in the interior of the computer system that serves as a server or client if the program is transmitted via a network such as the Internet or a communication line such as a telephone line.

The program described above may be transmitted from the computer system in which the program is stored in a storage device or the like to another computer system via a transmission medium or by a transmission wave in the transmission medium. Here, the "transmission medium" for transmitting the program refers to a medium having a function of transmitting information, such as a network (communication network) such as the Internet or a communication channel (communication line) such as a telephone line. The program described above may be for implementing a part of the functions described above. Furthermore, the program described above may be a so-called difference file (difference program) that can implement the functions described above in combination with a program already recorded in the computer system.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the inventions.

What is claimed is:

1. A post-processing apparatus, comprising:

a conveyance component configured to convey a print medium supplied from an image forming apparatus;

a discharge port that discharges the print medium conveyed by the conveyance component;

a tray on which the print medium discharged from the discharge port is stacked and which is raisable and lowerable in a vertical direction;

an elevation component configured to raise and lower the tray in the vertical direction;

a detector configured to detect a top surface of an uppermost print medium of one or more sheets of print media stacked on the tray; and a controller configured to control the conveyance component and the elevation component and hold a relative position of the top surface with respect to the discharge port at a first position, wherein the controller is further configured to determine if a predetermined number of sheets of print medium are discharged from the discharge port, if the detector detects the top surface of an uppermost print medium, lower the tray to a lowermost position, raise the tray until the detector detects the top surface of an uppermost print medium, move the tray so that the top surface is at the first position, and if one or more sheets of the print medium are not stacked on the tray, set a first speed as a speed at which a bundle pawl drive mechanism conveys the print medium; or if one or more sheets of print medium are stacked on the tray, read speed information stored in a storage component.

2. The post-processing apparatus according to claim 1, wherein the controller is further configured to store information indicating a speed at which a bundle pawl drive mechanism conveys the print medium in a storage component as speed information.

3. The post-processing apparatus according to claim 1, wherein the controller is further configured to read speed information stored in a storage component.

4. The post-processing apparatus according to claim 1, wherein the controller is further configured to set the speed indicated by the speed information read as the speed at which the bundle pawl drive mechanism conveys the print medium.

5. The post-processing apparatus according to claim 1, wherein the controller is configured to cause a speed at which the conveyance component conveys the print medium to reach a first speed while changing the speed in two or more steps if a discharge time is a first time and cause a speed at which the conveyance component conveys the print medium to reach a second speed while changing the speed in two or more steps if the discharge time is a second time.

6. The post-processing apparatus according to claim 1, wherein the controller is configured to specify a discharge time each time the print medium is supplied from the image forming apparatus and change a speed at which the conveyance component conveys the print medium according to a specified discharge time.

7. The post-processing apparatus according to claim 1, wherein the controller is configured to store speed information indicating a speed at which the conveyance component conveys the print medium finally supplied from the image forming apparatus in a storage component if the image forming apparatus ends supply of the print medium.

8. The post-processing apparatus according to claim 7, wherein the controller is configured to read the speed information from the storage component and set a speed indicated by the read speed information as the speed at which the conveyance component conveys the print medium if the image forming apparatus starts supplying the print medium and if one or more sheets of print media are stacked on the tray.

9. The post-processing apparatus according to claim 1, wherein the conveyance component is configured to include a belt for conveying the print medium supplied from the image forming apparatus to the discharge port, a motor for rotating the belt, and a bundle pawl provided on the belt and pushes the print medium located on the belt outward from the discharge port in response to rotation of the belt.

10. The post-processing apparatus according to claim 9, wherein a first timing indicates the timing at which the bundle pawl starts to move.

11. The post-processing apparatus according to claim 1, wherein the controller, if the print medium is discharged from the discharge port, lowers the tray to a second position and then raises the tray until the top surface is detected by the detector, and after that, if the top surface is detected by the detector, lowers the tray by a first lowering amount, thereby holding a relative position of the top surface with respect to the discharge port at the first position.

12. The post-processing apparatus according to claim 1, wherein the detector includes an actuator that protrudes from a surface on which the tray is provided in a discharge direction, in which the print medium is discharged from the discharge port, and is pushed by the uppermost print medium in a direction opposite to the discharge direction, and detect the top surface if the actuator is pushed in the direction opposite to the discharge direction.

13. An image forming apparatus, comprising:

an image forming component;

a conveyance component configured to convey a print medium;

a discharge port that discharges the print medium conveyed by the conveyance component;

a tray on which the print medium discharged from the discharge port is stacked and which is raisable and lowerable in a vertical direction;

an elevation component configured to raise and lower the tray in the vertical direction;

a detector configured to detect a top surface of an uppermost print medium of one or more sheets of print media stacked on the tray; and a controller configured to control the conveyance component and the elevation component and hold a relative position of the top surface with respect to the discharge port at a first position, wherein the controller is further configured to
determine if a predetermined number of sheets of print medium are discharged from the discharge port,
if the detector detects the top surface of an uppermost print medium, lower the tray to a lowermost position,
raise the tray until the detector detects the top surface of an uppermost print medium,
move the tray so that the top surface is at the first position, and
if one or more sheets of the print medium are not stacked on the tray, set a first speed as a speed at which a bundle pawl drive mechanism conveys the print medium; or
if one or more sheets of print medium are stacked on the tray, read speed information stored in a storage component.

14. The image forming apparatus according to claim 13, wherein
the controller is further configured to store information indicating a speed at which a bundle pawl drive mechanism conveys the print medium in a storage component as speed information.

15. The image forming apparatus according to claim 13, wherein the controller is further configured to
read speed information stored in a storage component.

16. The image forming apparatus according to claim 13, wherein the controller is further configured to
set the speed indicated by the speed information read as the speed at which the bundle pawl drive mechanism conveys the print medium.

17. A method of post-processing a print medium supplied from an image forming apparatus, comprising:
discharging the print medium conveyed by a conveyance component from a discharge port onto a tray on which the print medium is stacked and which is raisable and lowerable in a vertical direction by an elevation component configured to raise and lower the tray in the vertical direction;
detecting a top surface of an uppermost print medium of one or more sheets of print media stacked on the tray;
controlling the conveyance component and the elevation component and holding a relative position of the top surface with respect to the discharge port at a first position;
determining if a predetermined number of sheets of print medium are discharged from the discharge port;
if the top surface of an uppermost print medium is detected, lowering the tray to a lowermost position;
raising the tray until the top surface of an uppermost print medium is detected; and
moving the tray so that the top surface is at the first position, and
if one or more sheets of the print medium are not stacked on the tray, setting a first speed as a speed at which a bundle pawl drive mechanism conveys the print medium; or
if one or more sheets of print medium are stacked on the tray, reading speed information stored.

18. The method according to claim 17, further comprising:
storing information indicating a speed at which a bundle pawl drive mechanism conveys the print medium as speed information.

19. The method according to claim 17, further comprising:
reading speed information stored.

20. The image forming apparatus according to claim 17, wherein the controller is further configured to
setting the speed indicated by the speed information read as the speed at which the bundle pawl drive mechanism conveys the print medium.

* * * * *